(12) United States Patent
Kim et al.

(10) Patent No.: US 11,089,621 B2
(45) Date of Patent: Aug. 10, 2021

(54) METHOD AND DEVICE FOR SENDING AND RECEIVING SIGNALS ON THE BASIS OF COMPETITION-BASED NON-ORTHOGONAL MULTIPLE ACCESS SCHEME

(71) Applicant: LG Electronics Inc., Seoul (KR)

(72) Inventors: Myeongjin Kim, Seoul (KR); Sangrim Lee, Seoul (KR); Hojae Lee, Seoul (KR); Dongkyu Kim, Seoul (KR); Kwangseok Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 193 days.

(21) Appl. No.: 16/339,967

(22) PCT Filed: Apr. 28, 2017

(86) PCT No.: PCT/KR2017/004530
§ 371 (c)(1),
(2) Date: Apr. 5, 2019

(87) PCT Pub. No.: WO2018/066781
PCT Pub. Date: Apr. 12, 2018

(65) Prior Publication Data
US 2019/0289623 A1    Sep. 19, 2019

Related U.S. Application Data

(60) Provisional application No. 62/405,241, filed on Oct. 7, 2016.

(51) Int. Cl.
*H04W 72/12* (2009.01)
*H04L 5/00* (2006.01)
(Continued)

(52) U.S. Cl.
CPC ....... *H04W 72/1284* (2013.01); *H04L 5/0055* (2013.01); *H04L 27/2615* (2013.01);
(Continued)

(58) Field of Classification Search
CPC ............. H04W 72/1284; H04W 72/02; H04W 74/0866; H04L 5/0055; H04L 27/2615;
(Continued)

(56) References Cited

U.S. PATENT DOCUMENTS

| 5,515,396 A * | 5/1996 | Dalekotzin ............ H04B 1/707 375/142 |
| 6,078,576 A * | 6/2000 | Schilling .............. H04B 7/2618 370/335 |

(Continued)

FOREIGN PATENT DOCUMENTS

| WO | WO2012021231 | 2/2012 |
| WO | WO2015126114 | 8/2015 |

OTHER PUBLICATIONS

PCT International Search Report and Written Opinion in International Application No. PCT/KR2017/004530, dated Aug. 4, 2017, 20 pages (with English translation).

(Continued)

*Primary Examiner* — Dung B Huynh
(74) *Attorney, Agent, or Firm* — Fish & Richardson P.C.

(57) ABSTRACT

According to an embodiment of the present invention, a method is disclosed for transmitting a signal on the basis of a competition-based non-orthogonal multiple access scheme, by means of a terminal in a wireless communication system. At this time, the method for transmitting a signal comprises: a step of transmitting a first codeword on the basis of the competition-based NoMA scheme; a step of receiving a negative response to the first codeword transmission from a base station; a step of selecting a second codeword, taking into account a magnitude vector and a correlation of the first codeword; and a step of transmitting the selected second codeword on the basis of the competition-based NoMA scheme.

13 Claims, 11 Drawing Sheets

(51) Int. Cl.
  *H04L 27/26* (2006.01)
  *H04W 72/02* (2009.01)
  *H04W 74/08* (2009.01)
  *H04W 72/14* (2009.01)
  *H04W 74/00* (2009.01)

(52) U.S. Cl.
  CPC ...... *H04L 27/2672* (2013.01); *H04L 27/2688* (2013.01); *H04W 72/02* (2013.01); *H04W 72/14* (2013.01); *H04W 74/00* (2013.01); *H04W 74/08* (2013.01); *H04W 74/0866* (2013.01)

(58) Field of Classification Search
  CPC ............. H04L 27/2672; H04L 27/2688; H04L 27/26–32; H04L 1/18–1867; H04J 2011/0006; H04B 7/0456–0486
  See application file for complete search history.

(56) References Cited

U.S. PATENT DOCUMENTS

| | | | | |
|---|---|---|---|---|
| 6,157,612 | A * | 12/2000 | Weerackody | H04B 7/0604 370/215 |
| 8,917,802 | B1 * | 12/2014 | Su | H04L 27/0012 375/343 |
| 9,425,873 | B2 * | 8/2016 | Jongren | H04B 7/0697 |
| 9,432,096 | B2 * | 8/2016 | Hesse | H04B 7/0639 |
| 10,631,319 | B2 * | 4/2020 | Li | H04W 4/70 |
| 2003/0185175 | A1 * | 10/2003 | Golitscheck | H04L 1/0015 370/335 |
| 2005/0094597 | A1 * | 5/2005 | Hwang | H04L 5/0032 370/329 |
| 2007/0277075 | A1 | 11/2007 | Kim et al. | |
| 2008/0212695 | A1 * | 9/2008 | Mo | H04L 1/0071 375/260 |
| 2009/0103558 | A1 * | 4/2009 | Zangi | H04W 74/0841 370/447 |
| 2009/0275292 | A1 * | 11/2009 | Chang | H04W 74/0816 455/69 |
| 2009/0310653 | A1 * | 12/2009 | Gorday | H04B 1/7095 375/149 |
| 2010/0088570 | A1 * | 4/2010 | Choi | H04L 1/1812 714/751 |
| 2010/0091902 | A1 * | 4/2010 | Park | H04L 1/1893 375/295 |
| 2010/0124940 | A1 * | 5/2010 | Hassan | H04L 1/0003 455/509 |
| 2010/0135173 | A1 * | 6/2010 | Tynderfeldt | H04L 1/0029 370/252 |
| 2010/0202348 | A1 * | 8/2010 | Sambhwani | H04L 1/1822 370/328 |
| 2011/0182169 | A1 * | 7/2011 | Li | H04J 13/004 370/203 |
| 2011/0310853 | A1 * | 12/2011 | Yin | H04L 5/0023 370/335 |
| 2012/0218882 | A1 * | 8/2012 | Ko | H04B 7/0626 370/216 |
| 2012/0275381 | A1 * | 11/2012 | Kim | H04W 74/08 370/328 |
| 2013/0010712 | A1 * | 1/2013 | Kim | H04L 12/413 370/329 |
| 2015/0067435 | A1 * | 3/2015 | Yerramalli | H04L 1/0034 714/748 |
| 2015/0155976 | A1 * | 6/2015 | Fan | H04L 1/1861 714/749 |
| 2015/0280884 | A1 * | 10/2015 | Choi | H04L 25/0391 370/329 |
| 2016/0037460 | A1 * | 2/2016 | Benjebbour | H04L 5/0044 370/329 |
| 2016/0156452 | A1 * | 6/2016 | Dang | H04L 5/0055 370/330 |
| 2016/0294457 | A1 * | 10/2016 | Lee | H04B 7/0663 |
| 2017/0117986 | A1 * | 4/2017 | Perotti | H04L 1/005 |
| 2017/0170925 | A1 * | 6/2017 | Xu | H04L 1/0058 |
| 2017/0201968 | A1 * | 7/2017 | Nam | H04W 72/042 |
| 2017/0230087 | A1 * | 8/2017 | Sun | H04B 7/024 |
| 2017/0279725 | A1 * | 9/2017 | Lee | H04L 5/0055 |
| 2018/0035459 | A1 * | 2/2018 | Islam | H04W 74/04 |
| 2018/0083746 | A1 * | 3/2018 | Kang | H04L 5/0007 |
| 2018/0167946 | A1 * | 6/2018 | Si | H04W 72/0486 |
| 2018/0323920 | A1 * | 11/2018 | Zhu | H04L 5/0044 |
| 2019/0029031 | A1 * | 1/2019 | Kumar | H04W 28/0278 |
| 2019/0058518 | A1 * | 2/2019 | Koskela | H04W 72/046 |
| 2019/0059129 | A1 * | 2/2019 | Luo | H04W 72/042 |
| 2019/0090245 | A1 * | 3/2019 | Ansari | H04W 72/082 |
| 2019/0149303 | A1 * | 5/2019 | Yilmaz | H04L 1/203 370/329 |
| 2019/0222371 | A1 * | 7/2019 | Sahin | H04L 27/3416 |
| 2019/0229863 | A1 * | 7/2019 | Lei | H04L 5/0014 |
| 2019/0273576 | A1 * | 9/2019 | Zhang | H04L 5/0016 |
| 2020/0008261 | A1 * | 1/2020 | Islam | H04B 7/0695 |
| 2020/0037274 | A1 * | 1/2020 | Pan | H04W 16/28 |
| 2020/0228292 | A1 * | 7/2020 | Nguyen | H04L 1/1854 |
| 2020/0229092 | A1 * | 7/2020 | Wu | H04W 76/28 |

OTHER PUBLICATIONS

Intel Corporation, "On UL non-orthogonal multiple access schemes," R1-166552, 3GPP TSG RAN WG1 Meeting #86, Gothenburg, Sweden, Aug. 22-26, 2016, 5 pages.

LG Electronics, "Discussion on Non-orthogonal Spreading Sequences for NoMA," R1-166874, 3GPP TSG RAN WG1 Meeting #86, Gothenburg, Sweden, Aug. 22-26, 2016, 6 pages.

* cited by examiner

METHOD AND DEVICE FOR SENDING AND RECEIVING SIGNALS ON THE BASIS OF COMPETITION-BASED NON-ORTHOGONAL MULTIPLE ACCESS SCHEME

CROSS-REFERENCE TO RELATED APPLICATIONS

This application is a National Stage application under 35 U.S.C. § 371 of International Application No. PCT/KR2017/004530, filed on Apr. 28, 2017, which claims the benefit of U.S. Provisional Application No. 62/405,241, filed on Oct. 7, 2016. The disclosures of the prior applications are incorporated by reference in their entirety.

TECHNICAL FIELD

The present disclosure relates to a wireless communication system, and more particularly, to a method and device for transmitting and receiving a signal based on a contention-based Non-Orthogonal Multiple Access (NOMA) scheme.

BACKGROUND ART

Wireless communication systems have been widely deployed to provide various types of communication services such as voice, data, etc. In general, the wireless communication system corresponds to a multiple access system that can support communication between multiple users by sharing available system resources (e.g., bandwidth, transmission power, etc.). The multiple access system can be categorized into Orthogonal Multiple Access (OMA) and Non-Orthogonal Multiple Access (NOMA) depending on whether orthogonality is guaranteed. For example, the multiple access system includes a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, etc.

Meanwhile, the 3rd Generation Partnership Project Long Term Evolution (3GPP LTE) system was designed to have a frame structure with a Transmission Time Interval (TTI) of 1 ms, and the data delay time for a video application was 10 ms. However, the next-generation 5G technology requires data transmission with much lower latency due to the appearance of new applications such as real-time control and the Tactile Internet. Specifically, it is expected that 5G data delay will decrease to 1 ms. Moreover, the next-generation 5G technology requires that more terminals are connected to one base station. Specifically, it is expected that 5G connectivity will increase to a maximum of 1,000,000/km$^2$.

DISCLOSURE OF THE INVENTION

Technical Task

An object of the present disclosure is to provide a method by which a terminal receives based on a NOMA scheme in a wireless communication system.

Another object of the present disclosure is to provide a method by which a base station transmits a signal based on a contention-based NOMA scheme in a wireless communication system.

Still another object of the present disclosure is to provide a transmission method capable of reducing latency and overhead in a wireless communication system.

A further object of the present disclosure is to provide a method of performing signal retransmission with no increase in base station complexity.

Technical Solution

In an aspect of the present invention, provided is a method of transmitting a signal based on a contention-based Non-Orthogonal Multiple Access (NOMA) scheme by a terminal in a wireless communication system. The method may include: transmitting a first codeword based on the contention-based NOMA scheme; receiving a Negative Acknowledgement (NACK) for the transmission of the first codeword from a base station; selecting a second codeword by considering a magnitude vector of the first codeword and a correlation therewith; and transmitting the selected second codeword based on the contention-based NOMA scheme.

In another aspect of the present invention, provided is a terminal for transmitting a signal based on a contention-based Non-Orthogonal Multiple Access (NOMA) scheme in a wireless communication system. The terminal may include: a receiving module configured to receive a signal; a transmitting module configured to transmit a signal; and a processor configured to control the receiving module and the transmitting module. In this case, the processor may be configured to: transmit a first codeword based on the contention-based NOMA scheme using the transmitting module; receive a Negative Acknowledgement (NACK) for the transmission of the first codeword from a base station using the receiving module; select a second codeword by considering a magnitude vector of the first codeword and a correlation therewith; and transmit the selected second codeword based on the contention-based NOMA scheme using the transmitting module.

The following descriptions can be commonly applied to the method and device for transmitting a signal based on a contention-based NOMA scheme in a wireless communication system.

According to an embodiment of the present disclosure, when a NACK for the transmission of the second codeword is received, a third codeword may be transmitted based on the contention-based NOMA scheme.

According to an embodiment of the present disclosure, the third codeword may be selected independently from the first and second codewords and then transmitted.

According to an embodiment of the present disclosure, the NACK for the first codeword may be received together with an indicator.

According to an embodiment of the present disclosure, the indicator may indicate whether there is deep fading.

According to an embodiment of the present disclosure, when the indicator is set to a first value, the second codeword may be selected based on the magnitude vector of the first codeword and the correlation therewith. On the other hand, when the indicator is set to a second value, the second codeword may be selected independently from the first codeword.

According to an embodiment of the present disclosure, the first codeword may be transmitted in a first resource pool.

According to an embodiment of the present disclosure, when the NACK for the first codeword is received from the base station, the first codeword may be retransmitted in a second resource pool.

According to an embodiment of the present disclosure, a resource pool in which the first codeword is transmitted may be configured differently depending on the number of retransmission times according to the NACK for the first codeword.

According to an embodiment of the present disclosure, if there are a predetermined number or more of terminals within coverage of a cell where the terminal camps on, the first codeword may be transmitted based on a grant-based transmission scheme.

According to an embodiment of the present disclosure, when the first codeword is transmitted based on the contention-based NOMA scheme, the first codeword may be transmitted together with codewords of other terminals in a same time-frequency region. On the other hand, when the first codeword is transmitted based on the grant-based transmission scheme, the first codeword may be transmitted in a time-frequency region that is uniquely allocated by the base station.

Advantageous Effects

The present disclosure can provide a method by which a terminal receives a signal based on a NOMA scheme in a wireless communication system.

The present disclosure can provide a method by which a base station transmits a signal based on a contention-based NOMA scheme in a wireless communication system.

The present disclosure can provide a transmission method capable of reducing latency and overhead in a wireless communication system The present disclosure can provide a method of performing signal retransmission with no increase in base station complexity It will be appreciated by persons skilled in the art that that the effects that can be achieved through the present invention are not limited to what has been particularly described hereinabove and other advantages of the present invention will be more clearly understood from the following detailed description.

BEST MODE FOR INVENTION

Figure 1:
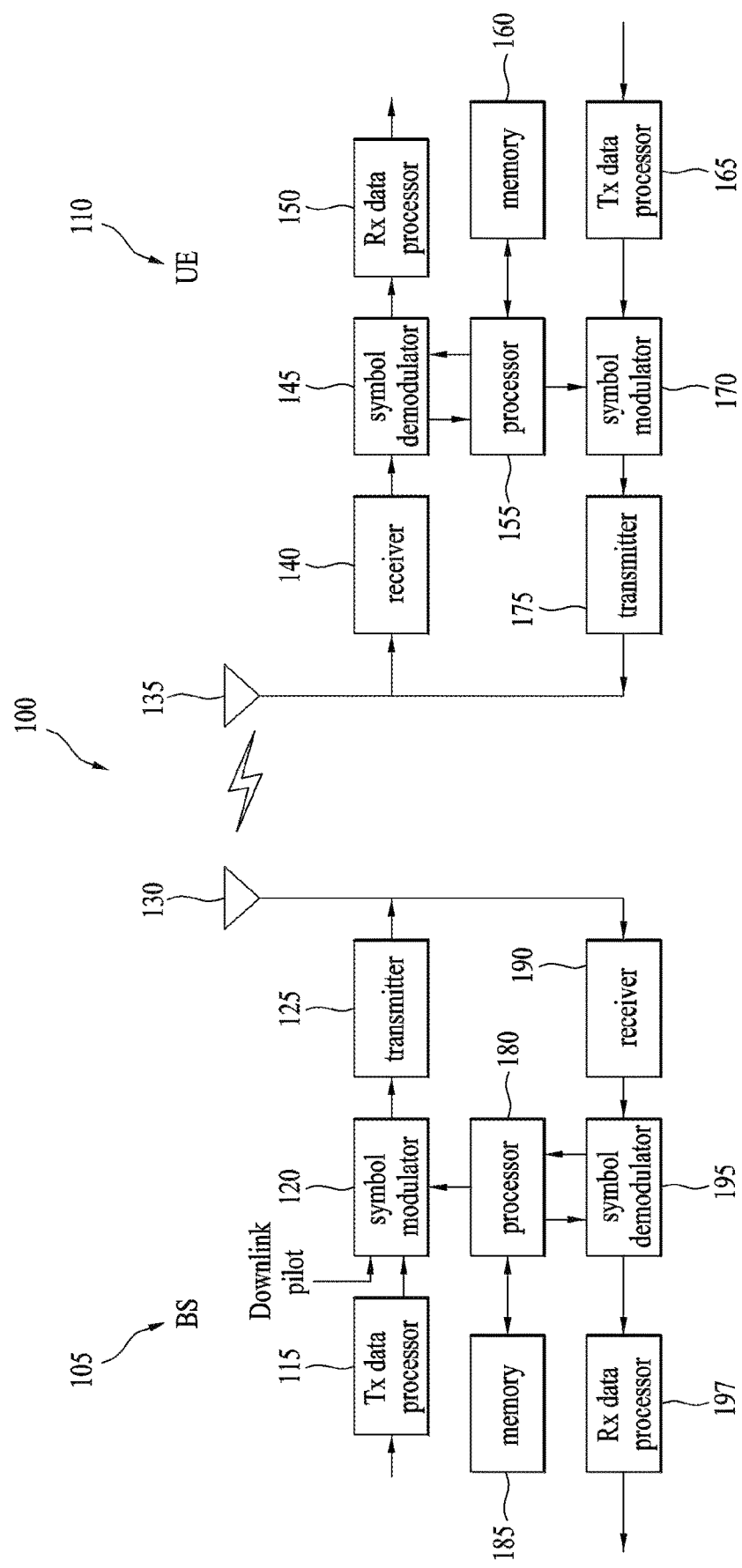
FIG. 1 is a block diagram illustrating the configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. However, it is apparent to those skilled in the art that the present disclosure can be implemented without these details. For instance, although the following descriptions are made in detail on the assumption that a mobile communication system is the 3GPP LTE system or LTE-A system, the following descriptions are applicable to other random mobile communication systems by excluding unique features of the 3GPP LTE and LTE-A systems.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. In addition, assume that a base station (BS) is a common name of such a random node of a network stage communicating with a terminal as a Node B (NB), an eNode B (eNB), an access point (AP) and the like.

In a mobile communication system, a UE can receive information from a BS in downlink and transmit information in uplink. The UE can transmit or receive various data and control information and use various physical channels depending types and uses of information transmitted or received thereby.

The following descriptions are applicable to various wireless access systems including a CDMA system, an FDMA system, a TDMA system, an OFDMA system, an SC-FDMA system, etc. CDMA can be implemented by radio technology such as Universal Terrestrial Radio Access (UTRA), CDMA 2000, etc. TDMA can be implemented with radio technology such as Global System for Mobile communications/General Packet Radio Service/Enhanced Data Rates for GSM Evolution (GSM/GPRS/EDGE). OFDMA can be implemented with radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS).

3GPP LTE is a part of Evolved UMTS (E-UMTS) using E-UTRA. The 3GPP LTE employs OFDMA in downlink and SC-FDMA in uplink. In addition, LTE-Advanced (LTE-A) is an evolved version of the 3GPP LTE.

Moreover, in the following description, specific terminologies are provided to help the understanding of the present disclosure. In addition, the use of the specific terminology can be modified into another form within the scope of the technical idea of the present disclosure.

Regarding wireless transmission between a BS and a UE, transmission from a BS to a UE is defined as downlink transmission, and transmission from a UE to a BS is defined as uplink transmission. A mode where radio resources for downlink transmission are different from those for uplink transmission is referred to as 'duplex mode'. In particular, a mode of performing transmission and reception bidirectionally by dividing time resources into downlink transmission time resources and uplink transmission time resources is referred to as 'Time Division Duplex (TDD) mode', and a mode of performing transmission and reception bidirectionally by dividing frequency bands into downlink transmission bands and uplink transmission bands is referred to as 'Frequency Division Duplex (FDD) mode'. It is apparent that the technology proposed in the present disclosure may operate not only in the FDD mode but also in the TDD mode.

FIG. 1 is a block diagram illustrating configurations of a BS 105 and a UE 110 in a wireless communication system 100.

Although one BS 105 and one UE 110 are shown in the drawing to schematically represent the wireless communication system 100, the wireless communication system 100 may include at least one BSn and/or at least one UE.

Referring to FIG. 1, the BS 105 may include a Transmission (Tx) data processor 115, a symbol modulator 120, a transmitter 125, a transmitting and receiving antenna 130, a processor 180, a memory 185, a receiver 190, a symbol demodulator 195, and a Reception (Rx) data processor 197.

The UE 110 may include a Transmission (Tx) data processor 165, a symbol modulator 170, a transmitter 175, a transmitting and receiving antenna 135, a processor 155, a memory 160, a receiver 140, a symbol demodulator 155, and a Reception (Rx) data processor 150. Although FIG. 1 shows that the BS 105 uses one transmitting and receiving antenna 130 and the UE 110 uses one transmitting and receiving antenna 135, each of the BS 105 and the UE 110 may include a plurality of antennas. Therefore, each of the BS 105 and the UE 110 according to the present disclosure can support the Multi-Input Multi-Output (MIMO) system. In addition, the BS 105 according to the present disclosure can also support both of the Single User-MIMO (SU-MIMO) system and the Multi-User-MIMO (MU-MIMO) system.

For downlink transmission, the Tx data processor 115 receives traffic data, formats the received traffic data, codes the formated traffice data, interleaves and modulates (or perform symbol mapping on) the coded traffic data, and provides modulated symbols (data symbols). The symbol modulator 120 provides a stream of symbols by receiving and processing the data symbols and pilot symbols.

The symbol modulator 120 performs multiplexing of the data and pilot symbols and transmits the multiplexed symbols to the transmitter 125. In this case, each of the transmitted symbols may be a data symbol, a pilot symbol or a zero value signal. In each symbol period, pilot symbols may be continuously transmitted. In this case, each of the pilot symbols may be a Frequency Division Multiplexing (FDM) symbol, an Orthogonal Frequency Division Multiplexing (OFDM) symbol, or a Code Division Multiplexing (CDM) symbol.

The transmitter 125 receives the symbol stream, converts the received symbol stream into one or more analog signals, adjusts the analog signals (e.g., amplification, filtering, frequency upconverting, etc.), and generates a downlink signal suitable for transmission on a radio channel. Thereafter, the transmitting antenna 130 transmits the downlink signal to the UE.

Hereinafter, the configuration of the UE 110 is described. The receiving antenna 135 receives the downlink signal from the BS and forwards the received signal to the receiver 140. The receiver 140 adjusts the received signal (e.g., filtering, amplification, frequency downconverting, etc.) and obtains samples by digitizing the adjusted signal. The symbol demodulator 145 demodulates the received pilot symbols and forwards the demodulated pilot symbols to the processor 155 for channel estimation.

The symbol demodulator 145 receives a frequency response estimation value for downlink from the processor 155, performs data demodulation on the received data symbols, obtains data symbol estimation values (i.e., estimation values of transmitted data symbols), and provides the data symbols estimation values to the Rx data processor 150. The Rx data processor 150 reconstructs the transmitted traffic data by demodulating (i.e., performing symbol demapping on), deinterleaving and decoding the data symbol estimated values. The processing performed by the symbol demodulator 145 and the Rx data processor 150 are complementary to that performed by the symbol modulator 120 and the transmission data processor 115 of the BS 105, respectively.

For uplink transmission, the Tx data processor 165 of the UE 110 processes the traffic data and provides data symbols. The symbol modulator 170 receives the data symbols, performs multiplexing of the received data symbols, modulates the multiplexed symbols, and provides a stream of symbols to the transmitter 175. The transmitter 175 receives the symbol stream, processes the received stream, and generates an uplink signal. The transmitting antenna 135 transmits the generated uplink signal to the BS 105.

The BS 105 receives the uplink signal from the UE 110 through the receiving antenna 130. The receiver 190 obtains samples by processing the received uplink signal. Subsequently, the symbol demodulator 195 processes the samples and provides pilot symbols received in uplink and data symbol estimation values. The Rx data processor 197 reconstructs the traffic data transmitted from the UE 110 by processing the data symbol estimation values.

The processor 155 of the UE 110 controls operations (e.g., control, adjustment, management, etc.) of the UE 110, and the processor 180 of the BS 105 controls operations (e.g., control, adjustment, management, etc.) of the BS 105. The processors 155 and 180 may be connected to the memory units 160 and 185 configured to store program codes and data, respectively. Specifically, the memory units 160 and 185, which are connected to the processors 155 and 180, respectively, store operating systems, applications, and general files.

Each of the processors 155 and 180 can be called a controller, a microcontroller, a microprocessor, a microcomputer or the like. In addition, the processors 155 and 180 can be implemented using hardware, firmware, software and/or any combinations thereof.

When the embodiments of the present disclosure are implemented using hardware, the processors 155 and 180 may be provided with Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc.

Meanwhile, when the embodiments of the present disclosure are implemented using firmware or software, the firmware or software may be configured to include modules, procedures, and/or functions for performing the above-explained functions or operations of the present disclosure. In addition, the firmware or software configured to implement the present disclosure is provided within the processors 155 and 180. Alternatively, the firmware or software may be saved in the memories 160 and 185 and then driven by the processors 155 and 180.

Radio protocol layers between a UE and a BS in a wireless communication system (network) may be classified as Layer 1 (L1), Layer 2 (L2), and Layer 3 (L3) based on three lower layers of the Open System Interconnection (OSI) model well known in communication systems. A physical layer belongs to the L1 layer and provides an information transfer service via a physical channel. A Radio Resource Control (RRC) layer belongs to the L3 layer and provides control radio resources between a UE and a network. That is, a BS and a UE may exchange RRC messages through RRC layers in a wireless communication network.

In the present specification, since it is apparent that the UE processor 155 and the BS processor 180 are in charge of processing data and signals except transmission, reception, and storage functions, they are not mentioned specifically for convenience of description. In other words, even if the processors 155 and 180 are not mentioned, a series of data processing operations except the transmission, reception, and storage functions can be assumed to be performed by the processors 155 and 180.

Figure 2:
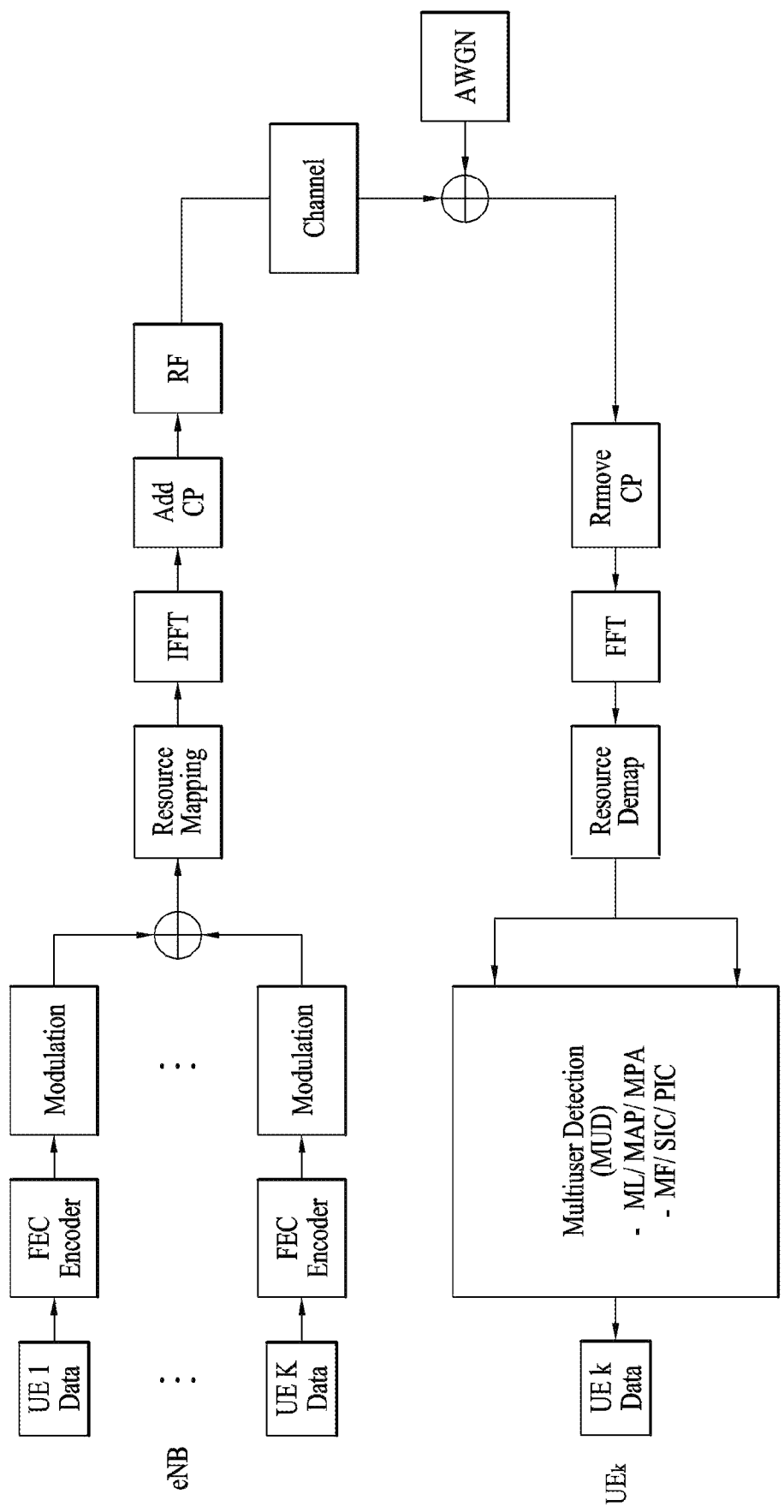
FIG. 2 is a block diagram illustrating NOMA-based downlink transmission/reception (Tx/Rx) of communication devices.

FIG. 2 is a block diagram illustrating NOMA-based downlink transmission/reception (Tx/Rx) of communication devices.

Specifically, FIG. 2 shows the structures of transmitting and receiving ends for downlink support in a NOMA system where information for multiple UEs (or users) is allocated to the same resource and transmitted thereon. In the 3GPP standardization, the NOMA system is referred to as 'Multiuser Superposition Transmission (MUST) system'. Since information for multiple UEs is superposed and transmitted on the same time-frequency resource in the NOMA system, it can guarantee high transmission capacity and increase the number of simultaneous accesses compared to the legacy LTE system. Thus, the NOMA system is considered as a core technology for the next generation 5G system. For example, the NOMA-based technology for the next-generation 5G system may include: MUST where UEs are identified based on their power levels; Sparse Code Multiple Access (SCMA) where modulation is performed based on a sparse complex codebook; and Interleave Division Multiple Access (IDMA) where a UE-specific interleaver is used.

Referring to FIG. 2, in the MUST system, a transmitting end modulates data for multiple UEs and then allocates different power to each symbol.

Alternatively, the transmitting end hierarchically modulates the data for the multiple UEs based on hierarchical modulation and then transmits the hierarchically modulated data. Meanwhile, a receiving end demodulates the data for the multiple UEs (hereinafter such data is referred to as multi-UE data) based on Multiuser Detection (MUD).

Referring to FIG. 2, in the SCMA system, the transmitting end replaces a Forward Error Correction (FEC) encoder and a modulation procedure for multi-UE data with a predetermined sparse complex codebook modulation scheme and then transmits the multi-UE data. The receiving end demodulates the multi-UE data based on MUD. Referring to FIG. 2, in the IDMA system, the transmitting end modulates and transmits FEC encoding information for multi-UE data using UE-specific interleavers, and the receiving end demodulates the multi-UE data based on MUD.

Each of the above systems may demodulate multi-UE data using various MUD schemes. For example, the MUD schemes may include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), Codeword Interference Cancellation (CWIC), etc. In this case, the demodulation complexity and processing time delay may vary depending on modulation schemes or the number of demodulation attempts.

Figure 3:
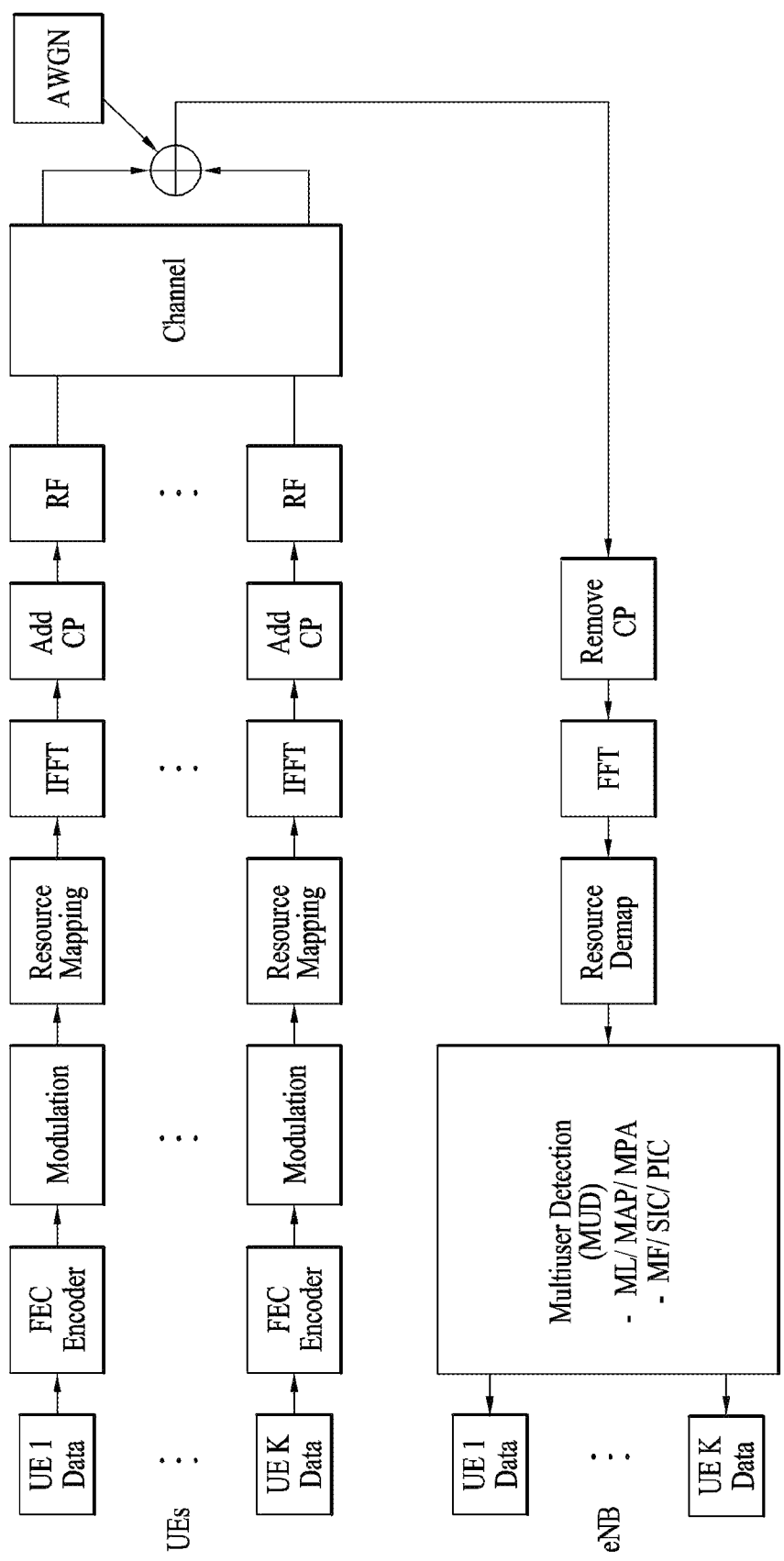
FIG. 3 is a block diagram illustrating NOMA-based uplink transmission/reception of communication devices.

FIG. 3 is a block diagram illustrating NOMA-based uplink transmission/reception of communication devices.

Specifically, FIG. 3 shows the structures of transmitting and receiving ends for uplink support in a NOMA-based system where information for multiple UEs (hereinafter such information is referred to as multi-UE information) is allocated to the same resource and transmitted thereon. In each system, a transmitting end of FIG. 3 may transmit multi-UE data in the same manner as described in FIG. 2, and a receiving end of FIG. 3 may demodulate the multi-UE in the same manner as described in FIG. 2. Since the NOMA-based system superposes and transmits signals for multiple UEs on the same time-frequency resource, it has a high decoding error rate compared to that of the LTE system but can support high frequency usage efficiency or large connectivity. In other words, the NOMA system can guarantee high frequency usage efficiency or large connectivity without any increase in the decoding error rate by controlling a coding rate according to system environments.

Compared to a case where data is allocated for a single UE, interference between multi-UE data is inevitable in the NOMA-based systems because the multi-UE data is allocated to the same resource. A signal at a kth receiving end in the NOMA-based system shown in FIG. 2 can be simply expressed as shown in Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In Equation 1, $h_k$ means a channel from the transmitting end to the kth receiving end, $s_k$ means a data symbol to the kth receiving end, and $n_k$ means signal noise. K is the number of multiple UEs allocated to the same time-frequency resource. The second term ($\sum_{n \neq k, n=1}^{K} h_k s_n$) of the third formula of Equation 1 indicates a Multiuser Interference (MUI) signal caused by data symbols to other receiving ends. Therefore, the transmission capacity according to the received signal can be simply expressed as shown in Equation 2 below.

$$C = \sum_{k=1}^{K} R_k \quad \text{[Equation 2]}$$

$$R_k = \log_2\left(1 + \frac{|h_k s_k|^2}{\left|\sum_{n \neq k, n=1}^{K} h_k s_n\right|^2 + \sigma_k}\right) =$$

$$\log_2\left(1 + \frac{\text{Channel Gain}}{MUI + \text{Noise}}\right), \forall k$$

Regarding the transmission capacity in Equation 2, since the number of added $R_k$ values increases as K increases, it is expected that C also increases. However, considering that MUI increases as K increases, each of the $R_k$ values decreases so that the entire transmission capacity C may decrease. Even if a MUD scheme can demodulate data for each UE while effectively decreasing the MUI, the presence of the MUI decreases the entire transmission capacity and requires high-complexity MUD. If the MUI caused by the multi-UE data transmission is minimized, the transmission capacity is expected to be higher. Alternatively, if the MUI caused by the multi-UE data transmission is able to be controlled quantitatively, it is possible to increase the transmission capacity by scheduling overlapping between the multi-UE data.

Figure 4:
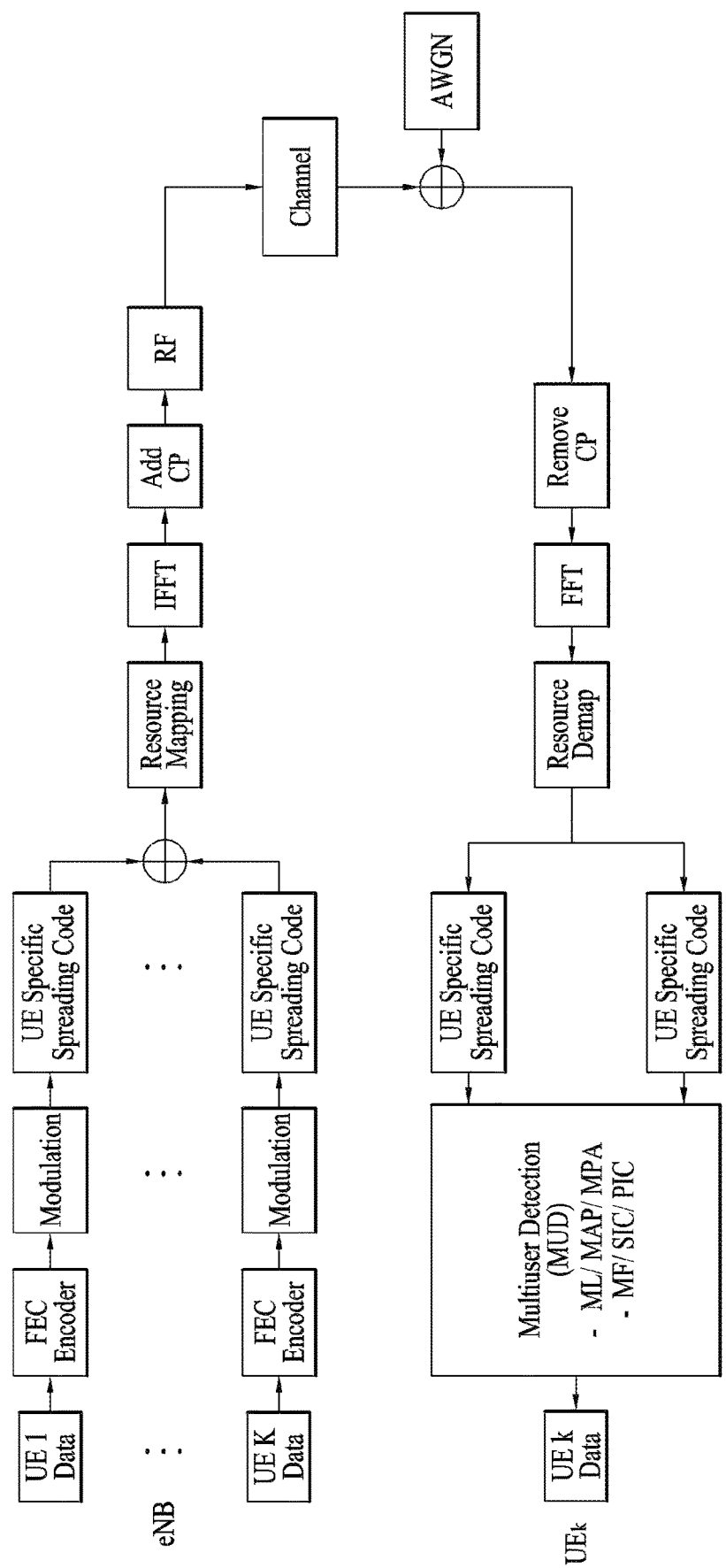
FIG. 4 is a block diagram illustrating downlink transmission/reception of communication devices based on non-orthogonal spreading codes.
Figure 5:
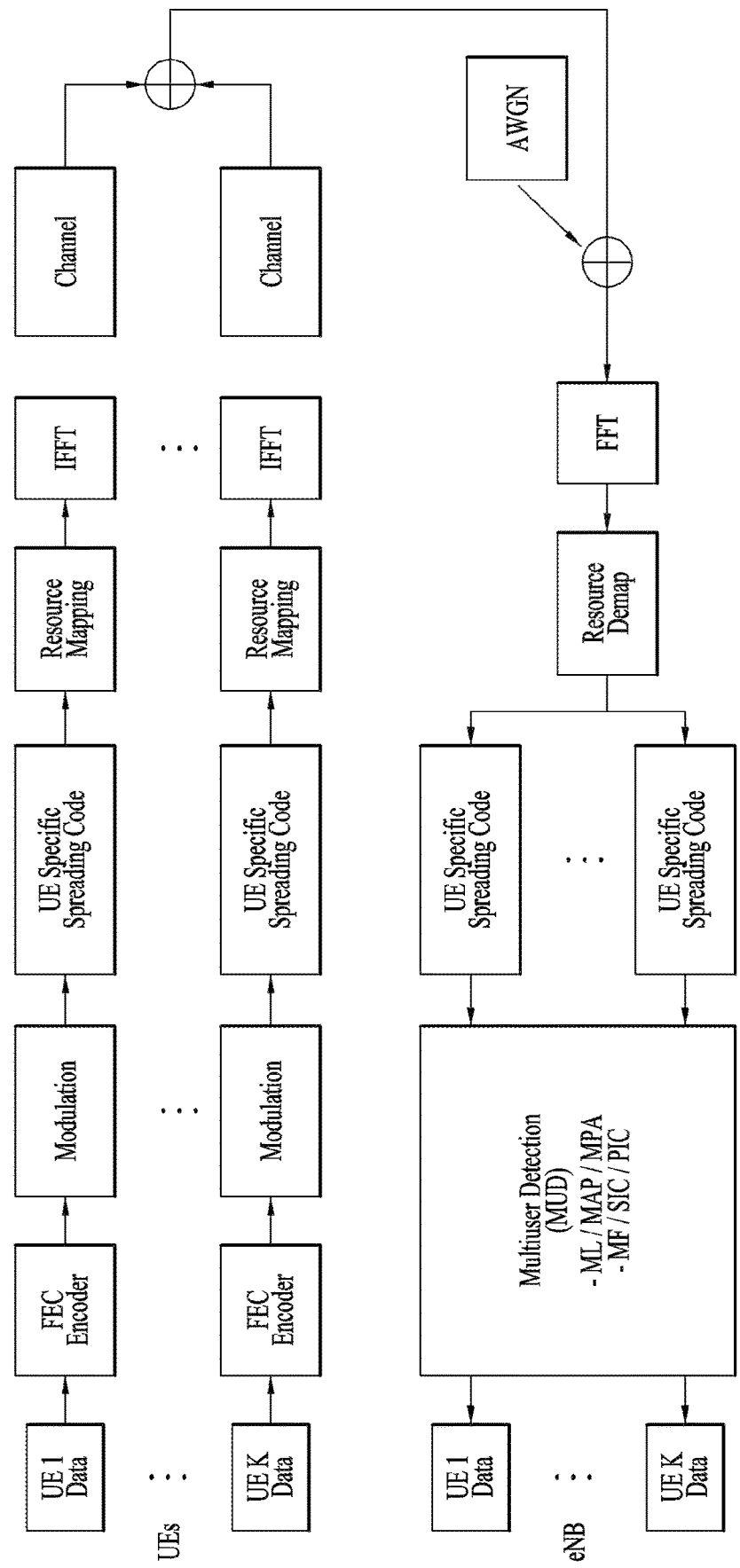
FIG. 5 is a block diagram illustrating uplink transmission/reception of communication devices based on non-orthogonal spreading codes.

FIG. 4 is a block diagram illustrating downlink transmission/reception of communication devices based on non-orthogonal spreading codes, and FIG. 5 is a block diagram illustrating uplink transmission/reception of communication devices based on non-orthogonal spreading codes.

Referring to FIGS. 4 and 5, a non-orthogonal codebook based system (e.g., SCMA, CDMA, etc.) among the NOMA systems may use a multiple access scheme in which non-orthogonal spreading codes are used when multi-UE (or multi-user) data is superposed and transmitted on the same time-frequency resource through spreading.

Specifically, FIG. 4 shows the structures of transmitting and receiving ends for downlink transmission in a NOMA system where multi-UE (or multi-user) data is superposed and transmitted using UE-specific spreading codes when the multi-UE (or multi-user) data is allocated to the same time-frequency resource, and FIG. 5 shows the structures of transmitting and receiving ends for uplink transmission in the same NOMA system. Although FIGS. 4 and 5 shows that the UE-specific spreading codes are used in the frequency domain, the present disclosure is not limited thereto. That is, the UE-specific spreading codes can be also used in the time domain.

Using a predefined codebook, each of transmitting and receiving ends allocates a UE-specific spreading code to each user. In this case, the UE-specific spreading code can be expressed as shown in Equation 3.

$$C = [c^{(1)} \; \ldots \; c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 3]}$$

A UE-specific spreading codebook may be a codebook satisfying the condition of $C \subset \mathbb{C}^{N \times K}$ and have the characteristics shown in Equation 4.

$$\begin{cases} |c^{(k)^*} \cdot c^{(k)}| = 1, \forall k, k = 1, \ldots, K, \\ |c^{(k)^*} \cdot c^{(j)}| = \delta_{kj}, \forall k, \forall j, k \neq j, k = 1, \ldots, K, j = 1, \ldots, K, \end{cases} \quad \text{[Equation 4]}$$

Figure 6:
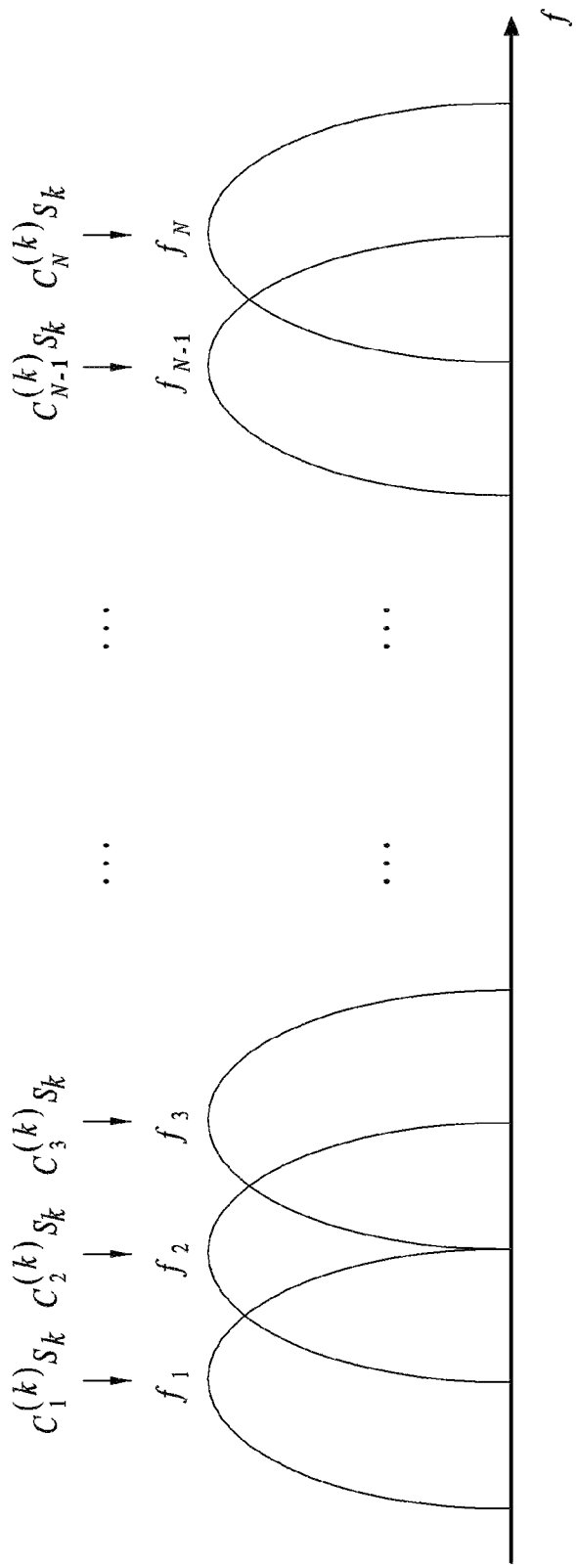
FIG. 6 is a conceptual diagram illustrating data transmission based on UE-specific spreading codes in the frequency domain.

FIG. 6 is a conceptual diagram illustrating data transmission based on UE-specific spreading codes in the frequency domain.

As described above with reference to FIGS. 4 and 5, when multi-UE (or multi-user) information is allocated to the same time-frequency resource, UE-specific spreading codes can be used.

Specifically, FIG. 6 shows the concept of transmission of data for a kth UE (or user) based on a UE-specific spreading code in the frequency domain. If a codebook is predetermined, the data for the kth UE (or user) is multiplied by a codeword corresponding to the kth UE (or user) and then transmitted.

In this case, a data symbol, $s_k$ corresponds to a codeword vector, $c^{(k)}$ with a size of N by 1. N elements of the codeword correspond to N subcarriers, respectively. That is, in FIG. 6, since one data symbol is transmitted over N subcarriers, the time-frequency resource efficiency is reduced to 1/N compared to that of the legacy LTE system. On the other hand, if K or more symbols are superposed and transmitted, the time-frequency resource efficiency increases compared to that of the legacy LTE system. For example, in the case of N<K, if K symbols are superposed and transmitted, the frequency resource efficiency increases by K/N times.

Figure 7:
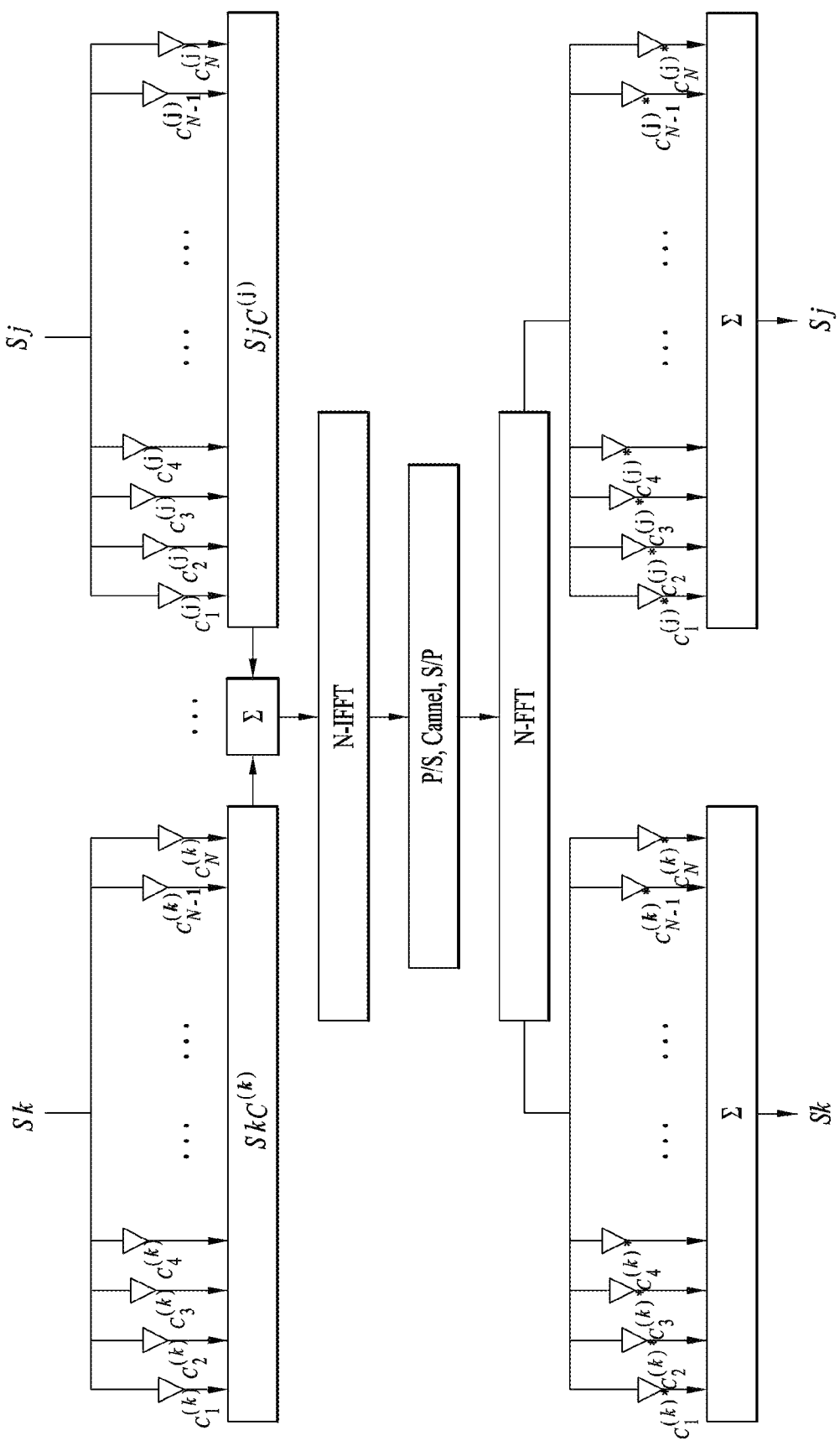
FIG. 7 is a diagram illustrating the basic transmission and reception structure of a non-orthogonal UE-specific spreading code based NOMA system.

FIG. 7 illustrates the basic transmission and reception structure of a non-orthogonal UE-specific spreading code based NOMA system.

Referring to FIG. 7, a transmitting end converts a data symbol for each UE (or user) to a UE-specific spreading code corresponding to each UE (or user) and superposes converted data symbols. The superposed frequency-domain signal with a length of N is converted into a time-domain signal by N-IFFT, and then OFDM transmission is performed. Meanwhile, a receiving end reconstructs the frequency-domain signal using N-FFT. Based on the reconstructed frequency-domain signal, the receiving end decodes the data symbol for each UE (or user) using a conjugate codeword of the UE-specific spreading code corresponding to each UE (or user).

The decoded data symbol, $s_k$ may include MUI depending on the number of superposed users, and MUD can guarantee accurate decoding of $s_k$. In this case, the length of the converted frequency-domain signal may vary depending on predetermined UE-specific spreading codes, and more particularly, it can be less than N. For example, assuming that two frequency-domain signals, which are converted using a UE-specific spreading code with a length of N/2, are concatenated to form a signal with the length of N, it is apparent that the receiving end can decode the signal using the N-FFT.

In the case of downlink, detection performed by a kth UE (or user), that is, a kth receiving end to decode data can be expressed as shown in Equation 5 below.

$$y_k = \sum_{n=1}^{K} H_k c^{(n)} s_n + n_k, \quad \text{[Equation 5]}$$

$$\hat{y}_k = \left[ \frac{[y_k]_j}{[H_k]_{j,j}} \right]_{j=1,\ldots,N} = \sum_{n=1}^{K} c^{(n)} s_n + \hat{n}_k,$$

In Equation 5, $H_k$ is an N by N channel matrix from a kth transmitting end to a receiving end and includes frequency-domain channel coefficients as a diagonal matrix. In addition, $c^{(k)}$ is an N by 1 UE-specific NCC vector for the receiving end at the kth transmitting end, $s_k$ is a data symbol to the kth receiving end, and n is an N by 1 signal noise vector. Moreover, K is the number of multiple UEs allocated to the same time-frequency resource. In this case, $$\left[ \frac{[A]_j}{[B]_{j,j}} \right]_{j=1,\ldots,N}$$

means division of a jth element of vector A by a jth diagonal element of matrix B. If the vector A is a diagonal matrix, the above operation means element division between the two diagonal matrices. If channel compensation is applied to Equation 5, a signal with desired codewords and noise remains. Then, using a conjugate codeword of a UE-specific spreading code, the detection at the receiving end can be expressed as shown in Equation 6.

$$\tilde{y}_k = c^{(k)*} \cdot \hat{y}_k = c^{(k)*} \cdot c^{(k)} s_k + \sum_{n \neq k, n=1}^{K} c^{(k)*} \cdot c^{(n)} s_n + \tilde{n}_k, \quad \text{[Equation 6]}$$

$$= s_k + \sum_{n \neq k, n=1}^{K} c^{(k)*} \cdot c^{(n)} \cdot s_n + \tilde{n}_k.$$

The second term of the last formula in Equation 6 indicates MUI, and it can be cancelled or reduced by MUD.

In the case of uplink, detection performed by a BS, i.e., a receiving end to decode data can be expressed as shown in Equation 7.

$$y = \sum_{n=1}^{K} H_n c^{(n)} s_n + n = H_k c^{(k)} s_k + \sum_{n \neq k, n=1}^{K} H_n c^{(n)} s_n + n_r \quad \text{[Equation 7]}$$

The second term of the third formula in Equation 7 indicates MUI, that is, a multi-UE (or multi-user) interference signal caused by data symbols to other receiving ends. The detection performed by the receiving end to decode data of a kth UE (or user) can be expressed as shown in Equation 8.

$$\hat{y}_k = \left[ \frac{[y]_j}{[H_k]_{j,j}} \right]_{j=1,\ldots,N} = \quad \text{[Equation 8]}$$

$$c^{(k)} s_k + \sum_{n=1}^{K} \left[ \frac{[H_n]_{j,j}}{[H_k]_{j,j}} \right]_{j=1,\ldots,N} c^{(n)} s_n + \hat{n}_r$$

If channel compensation for the data of the kth UE (or user) is applied, a signal with desired codewords, MUI, and noise remains. Then, using a conjugate codeword of a UE-specific spreading code, the detection at the receiving end can be expressed as shown in Equation 9.

$$\tilde{y}_k = c^{(k)*} \cdot \hat{y}_k = c^{(k)*} \cdot c^{(k)} s_k + \sum_{n \neq k, n=1}^{K} c^{(k)*} \cdot \left[ \frac{[H_n]_{j,j}}{[H_k]_{j,j}} \right]_{j=1,\ldots,N} c^{(n)} s_n + \tilde{n}, \quad \text{[Equation 9]}$$

$$= s_k + \sum_{n \neq k, n=1}^{K} c^{(k)*} \cdot \left[ \frac{[H_n]_{j,j}}{[H_k]_{j,j}} \right]_{j=1,\ldots,N} c^{(n)} \cdot s_n + \tilde{n}.$$

The second term of the last formula in Equation 9 indicates MUI, and it can be cancelled or reduced by MUD. In this case, a channel variation in the frequency domain of $$\left[ \frac{[H_n]_{j,j}}{[H_k]_{j,j}} \right]_{j=1,\ldots,N}$$

causes a change in the Euclidian Distance value between UE-specific spreading codes due to different channel environments of multiple UEs (or users).

The above-described NOMA technology can be used together with contention-based transmission in order to reduce latency and overhead caused by uplink grant-based transmission and allow more users to transmit data at the same time. Such a combination is referred to as 'contention-based NOMA'. When UEs transmit data in uplink using a contention-based NOMA scheme, a BS informs the UEs whether their transmission is successful through ACK/NACK signaling. If a UE fails in transmitting data, the UE needs to retransmit the data. In this case, to increase its transmission success rate, the UE should perform the retransmission in a different way from the first transmission. For example, the UE should attempt the retransmission after decreasing the code rate or changing the codeword. That is, an efficient data retransmission method is required to improve the transmission success rate.

Figure 8:
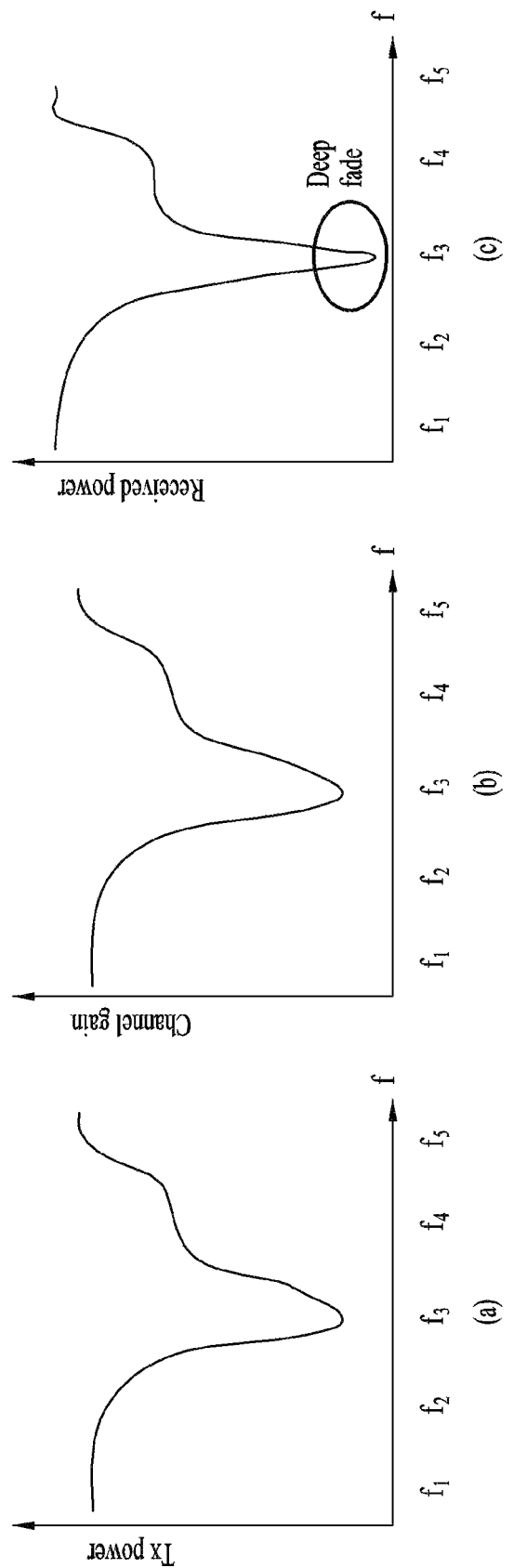
FIG. 8 is a diagram illustrating the magnitudes of transmission power, channel gain, and received power in the frequency domain when a UE transmits a signal.

FIG. 8 illustrates the magnitudes of transmission power, channel gain, and received power in the frequency domain when a UE transmits a signal.

As described above, uplink transmission can be performed using a contention-based NOMA scheme in order to reduce latency and uplink overhead. In this case, whether the uplink transmission is successful can be indicated by ACK/NACK. If a UE receives NACK, the UE may perform uplink retransmission.

However, when the uplink transmission is performed using the contention-based NOMA scheme to reduce the latency and overhead, if the number of retransmission times increases due to frequent transmission failure, there may be no gain in terms of the latency and overhead compared to when the uplink transmission is performed using a conventional UE grant.

Thus, a method of increasing the transmission success rate may be required when retransmission is performed using a contention-based NOMA scheme. Hereinafter, a method of performing retransmission in the contention-based NOMA system will be described.

For example, a method of reducing the code rate can be considered to increase the retransmission success rate and reduce the number of retransmission times. However, this method may be inefficient in that a decrease in the code rate requires a large resource region and increases BS complexity.

Hence, when the retransmission is performed in the contention-based NOMA system, a method capable of increasing the retransmission success rate by changing only a codeword without any increase in the resource region and BS complexity is required.

Hereinafter, a method of selecting a codeword during retransmission in a contention-based NOMA system and a data decoding procedure therefor will be described.

Specifically, FIG. 8(a) shows the transmission power when the UE transmits the signal. In FIG. 8(a), each tone may have different transmission power due to codewords selected by the UE for the transmission. In addition, FIG. 8(b) shows the channel gain. In FIG. 8(b), the channel gain may have a different value in each tone due to channel characteristics.

For example, the deep fading phenomenon, where not only transmission power but channel gain decrease, may occur in a specific tone. As a result, the decoding success rate may decrease. FIG. 8(c) shows the deep fading phenomenon occurs at $f_3$ due to decreases in both the transmission power and channel gain. In other words, the decoding success rate may decrease in the worst case where both the transmission power and channel gain decrease. In this case, a BS may transmit NACK, and the UE may perform the retransmission upon recognizing the failure of the first transmission.

Meanwhile, when the UE performs the retransmission in the contention-based NOMA system, the UE may perform the retransmission on the same resource without changing the code rate. To solve the above problem, the UE may assume that the channel gain decreases in a tone where the transmission power of the first signal is low. That is, when performing the retransmission, the UE may increase the transmission power in the tone where the channel gain decreases based on the above assumption. In other words, when performing the retransmission, the UE may select a codeword capable of increasing signal transmission power in the tones where the first signal transmission power is low.

When the retransmission is performed as described above, it is possible to overcome the deep fading phenomenon, thereby improving the decoding success rate. In addition, the decoding success rate can be improved by compensating the tones where the first signal transmission power is low though hybrid automatic repeat request (HARQ) combining. However, the present disclosure is not limited thereto.

Figure 9:
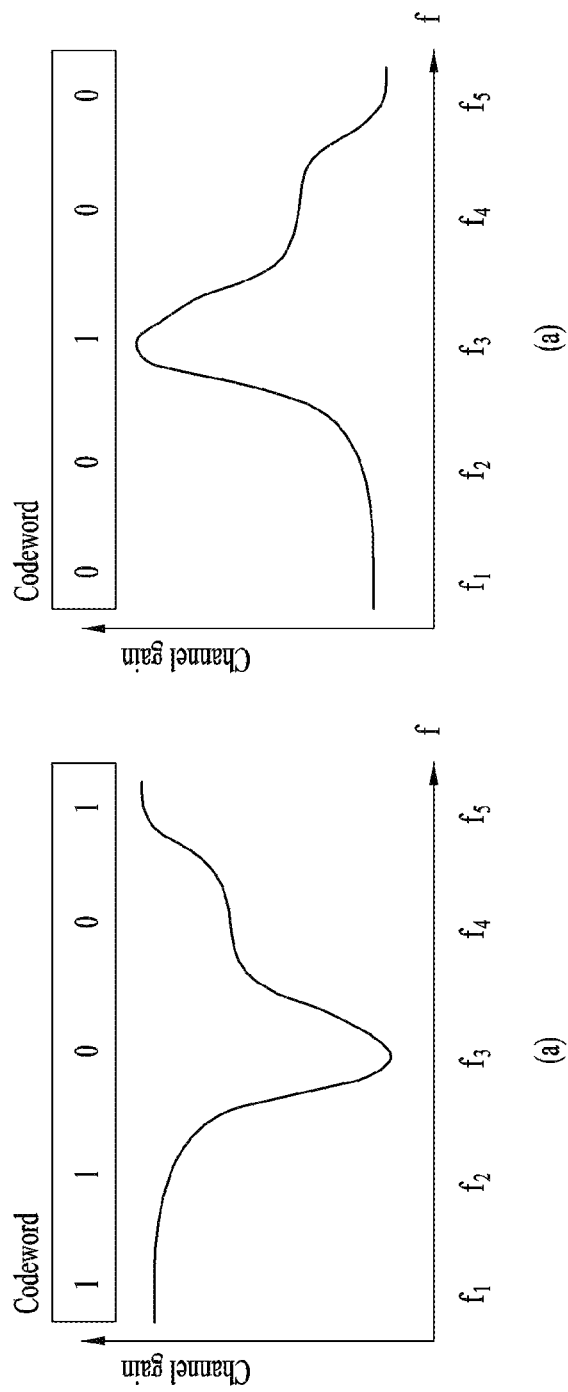
FIG. 9 is a diagram illustrating transmitted codewords and channel gains in the frequency domain.

FIG. 9 illustrates transmitted codewords and channel gains in the frequency domain.

Referring to FIG. 9 (a), the decoding success rate may decrease due to the deep fading phenomenon as described above. In this case, for example, the retransmission can be performed by reselecting a codeword different from that of the first transmission as shown in FIG. 9 (b). By doing so, diversity gain can be obtained.

More specifically, when performing the retransmission, the UE may select the codeword capable of increasing the signal transmission power in the tone where the first signal transmission power is low. In this case, the codeword may be selected as follows. The codeword used for the second transmission may be determined based on the magnitude vector of the codeword used for the first transmission and a correlation therewith.

For example, it is assumed that the codeword selected for the first transmission is $a_1$, the codeword selected for the second transmission is $a_2$, and a codebook used in selecting the codeword for the second transmission is C. Here, the codebook C may be $c_1, c_2, \ldots, c_N$. In this case, the UE may attempt the retransmission by selecting a codeword of which the magnitude vector has the lowest correlation with that of the codeword used for the first transmission as $a_2$. That is, $a_2$ can be determined as shown in Equation 10.

$$a_2 = \min_{c_n \in C} |a_1| \cdot |c_n| \quad \text{[Equation 10]}$$

As another example, the UE may attempt the retransmission by selecting a codeword of which the magnitude vector has the highest correlation with the reciprocal of the magnitude vector of the codeword used for the first transmission as $a_2$. That is, $a_2$ can be determined as shown in Equation 11.

$$a_2 = \max_{c_n \in C} \frac{1}{|a_1|} \cdot |c_n| \quad \text{[Equation 11]}$$

If the codeword used for the second transmission is selected based on the codeword used for the first codeword as shown in FIG. 9(b), it is possible to obtain improved diversity gain.

In addition, 1-to-1 or 1-to-N mapping can be established between the codeword used for the first transmission and the codeword used for the second transmission. In addition, the UE may use different codebooks in the first and second transmission. However, a codebook to be used may be predetermined based on the number of transmission attempts to prevent blind detection complexity of the BS from increasing. By doing so, a codeword used for (n−1)th transmission may be anticipated from a codeword used for nth transmission, and the complexity may be reduced by performing HARQ combining using a previously transmitted signal.

Moreover, when the UE receives NACK due to the failure of the second transmission, the UE may attempt third transmission. In this case, for example, a codeword for the third transmission may be selected independently from the first and second transmission.

More specifically, the third codeword may be determined by considering the magnitude vector of the codeword used for the first transmission and a correlation therewith on the assumption that the codeword for the second transmission is deeply faded. However, if the UE receives NACK due to the failure of the second transmission, the transmission failure may be related to other causes rather than the deep fading. Thus, the UE may attempt the third transmission by selecting a codeword independent from the first and second transmission.

For example, in case of odd-numbered transmission, the UE may perform the corresponding transmission using a codeword independent from those of other transmission, and in case of even-numbered transmission, the UE may perform the corresponding transmission using a codeword determined based on the magnitude vector of a codeword used for the previous transmission and a correlation therewith. In other words, a codeword selection rule may be determined based on whether transmission is odd-numbered transmission or even-numbered transmission. However, the present invention is not limited thereto.

As another example, a bit(s) for indicating the deep fading phenomenon can be additionally included in NACK transmitted from the BS. That is, an indicator indicating that the codeword for the retransmission can be selected based on the magnitude vector of the previous transmission and a correlation therewith may be transmitted together with the NACK. For instance, a one-bit indicator may be used to indicate the deep fading phenomenon. If the indicator has a first value for indicating transmission where the deep fading phenomenon is considered, the retransmission may be performed as described above. On the contrary, if the indicator has a second value that does not indicates the transmission where the deep fading phenomenon is considered, the codeword can be selected independently and then transmitted as in the prior art.

When a specific UE is detected from among UEs continuously performing contention-based NOMA transmission, if NACK is transmitted to the specific UE, a deep-fading indication bit(s) can be added, whereby the above-described operation can be performed.

When 1-to-1 or 1-to-N mapping is established between Demodulation Reference Signals (DMRSs) and Multiple Access (MA) signatures (e.g., codeword indices), if the deep fading phenomenon occurs in channel gain estimated using the DMRSs, the BS may transmit, to the UE, an additional 1 bit together with NACK to inform the occurrence of the deep fading phenomenon. However, the present disclosure is not limited thereto.

As a further example, when a UE performs uplink transmission using the contention-based NOMA scheme, the UE may perform frequency hopping according to the number of transmission times. By doing so, the UE may perform the transmission using different resource pools in the frequency domain.

More specifically, when a UE receives NACK in the contention-based NOMA system, the UE may select a codeword to transmit by considering the previous codeword in order to improve the retransmission success rate as described above. However, if the channel gain at the corresponding frequency is poor all over the tones, decoding failure may continuously occur even though the UE attempts the transmission by continuously changing the codeword.

To overcome this problem, the UE may perform the transmission using a different resource pool in the frequency domain through frequency hopping. In this case, for example, the UE may perform the frequency hopping only in even-numbered transmission except odd-numbered transmission. However, since the frequency channel characteristics may vary at the time when the frequency hopping is performed, the UE may attempt retransmission by changing the codeword on the same resource pool in the frequency domain without the frequency hopping. In this case, frequency hopping patterns may be predetermined for HARQ combining.

As still another example, when a UE performs retransmission in the contention-based NOMA system, the UE may apply the codeword change and the frequency hopping according to order of priority. For instance, upon receiving NACK, the UE may select a codeword for the retransmission based on the previous codeword and then perform the retransmission. In this case, the UE may not perform the frequency hopping. If the UE receives NACK after transmitting the selected codeword, the UE may independently select a codeword by performing the frequency hopping and then perform the retransmission using the independently selected codeword. In other words, the UE may select a codeword by considering the deep fading phenomenon and then perform the retransmission. Thereafter, if the UE receives additional NACK, the UE may further perform the retransmission by applying the frequency hopping.

As still a further example, when a UE performs retransmission in the contention-based NOMA system, the UE may perform the frequency hopping before the codeword change. If the UE receives NACK again, the UE may perform the retransmission based on the codeword change. However, the present disclosure is not limited thereto.

As yet another example, a network can preconfigure multiple resource pools for contention-based NOMA. Among the preconfigured resource pools, a different resource pool may be indicated depending on the number of repetitions or the number of retransmission times. Thus, if a BS performs HARQ combining to decode an nth signal transmitted from a UE, the BS can easily recognize the location of an (n−1)th signal. In addition, the resource pools where nth and (n+1)th transmission is performed (where n=1, 2, 3, . . . ) may be configured to be located in the same frequency region in order to increase the decoding success rate according to the above-described retransmission method.

As yet a further example, to obtain frequency diversity gain in odd-numbered transmission (i.e., (2n−1)th transmission where n n=1, 2, 3, . . . ) through the frequency hopping, resource pools may be configured to be located in different frequency regions. However, the present disclosure is not limited thereto.

As still yet a further example, if there are a number of UEs in cell coverage, the number of UEs that attempt transmission at the same using the contention-based NOMA scheme may increase as well. Thus, the number of collisions between UEs may increase, and it may causes a decrease in the decoding success rate. Therefore, if the number of UEs in the cell coverage is more than a predetermined value (or a threshold), a network may allow the UEs to perform grant-based transmission. In other words, when the number of UEs in the cell coverage increases, the efficiency of the contention-based NOMA scheme may be degraded, and thus transmission can be performed based on resource allocation as in the prior art. Specifically, the contention-based NOMA scheme may reduce latency compared to the grant-based transmission. However, if the number of collisions increases due to an increase in the number of UEs, the number of retransmission times may increase, and thus the latency may increase. In this case, use of the conventional method may be more efficient. Therefore, if the number of retransmission attempts is equal to or more than a specific value, the system may switch its transmission to the grant-based transmission. In this case, the predetermined number may vary depending on the size of the cell coverage. In addition, the predetermined number may also vary depending on channel state information, cell environments, etc. However, the present disclosure is not limited thereto.

Figure 10:
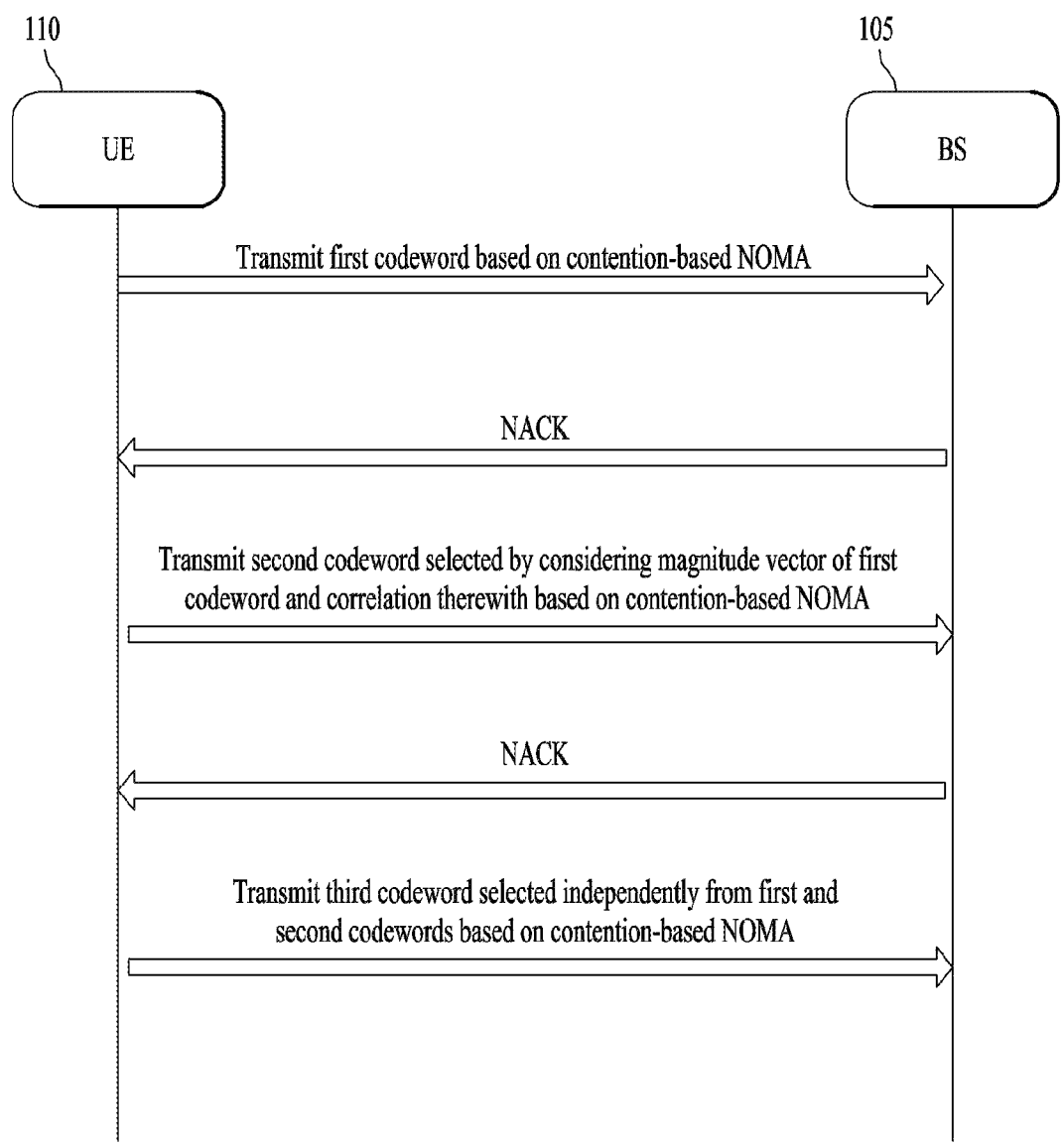
FIG. 10 is a diagram illustrating the flow of signals according to a contention-based NOMA scheme.

FIG. 10 illustrates the flow of signals according to a contention-based NOMA scheme.

A UE 110 can exchange signals with a BS 105. In this case, for example, the UE 110 may exchange signals with the BS 105 based on a contention-based NOMA scheme. In addition, for example, the UE 110 may exchange signals with the BS 105 based on a grant-based scheme. In the legacy LTE system, the UE 110 may exchange signals with the BS 105 using the grant-based scheme, that is, though a time-frequency domain region allocated to the UE 110. Meanwhile, according to the present disclosure, a NOMA scheme can be used to allow multiple UEs to exchange signals with the BS 105 through the same time-frequency domain region. In particular, the UE 110 may exchange signals with the BS 105 based on the contention-based NOMA scheme as described above.

For example, the UE 110 may transmit a first codeword to the BS 105 based on the contention-based NOMA scheme. In this case, the first codeword may be configured according to a predetermined rule, or it may be randomly selected. However, the present disclosure is not limited thereto. Thereafter, the UE 110 may receive NACK as a negative response to the first codeword from the BS 105.

Upon receiving NACK, the UE 110 may select a second codeword by considering the magnitude vector of the first codeword and a correlation therewith. That is, when signal transmission fails, the UE may select a codeword for retransmission by considering deep fading. The UE may transmit the second codeword to the BS 105 based on the contention-based NOMA scheme.

As another example, the UE 110 may receive an indicator indicating the deep fading together with the NACK. When the UE 110 receives the indicator indicating the deep fading together with the NACK, the UE 110 may select the second codeword based on the indicator. In other words, when the UE 110 does not receive the indicator, the UE 110 may select the second codeword based on the first codeword and then transmit the selected second codeword. On the contrary, when the UE 110 receives the indicator, the UE 110 may perform the selection based on information indicated by the indicator.

In this case, the indicator may include 1-bit information. If the indicator indicates that the second codeword should be selected based on the first codeword by considering the deep fading, the second codeword may be selected based on the first codeword and then transmitted. On the other hand, if the indicator indicates that the second codeword needs to be selected without consideration of the deep fading, the second codeword may be selected independently from the first codeword. In this case, the second codeword may be configured according to a predetermined rule, or it may be randomly selected. However, the present disclosure is not limited thereto.

Thereafter, the UE 110 may receive NACK as a negative response to the second codeword. When the UE 110 receives the negative response to the second codeword, the transmission failure may be related to other causes rather than the deep fading. In this case, the UE 110 may independently select a third codeword regardless of the first and second codewords. The third codeword may be predetermined according to a predetermined rule, or it may be randomly selected. However, the present disclosure is not limited thereto. Thereafter, the UE 110 may transmit the third codeword based on the contention-based NOMA scheme.

For example, in odd-numbered transmission, the UE 110 may transmit an independent codeword. On the contrary, in even-numbered transmission, the UE 110 may select a codeword based on the magnitude vector of the previous codeword and a correlation therewith and then transmit the selected codeword using the contention-based NOMA scheme. In other words, only in the even-numbered transmission, the UE 100 may perform retransmission by considering the deep fading.

Figure 11:
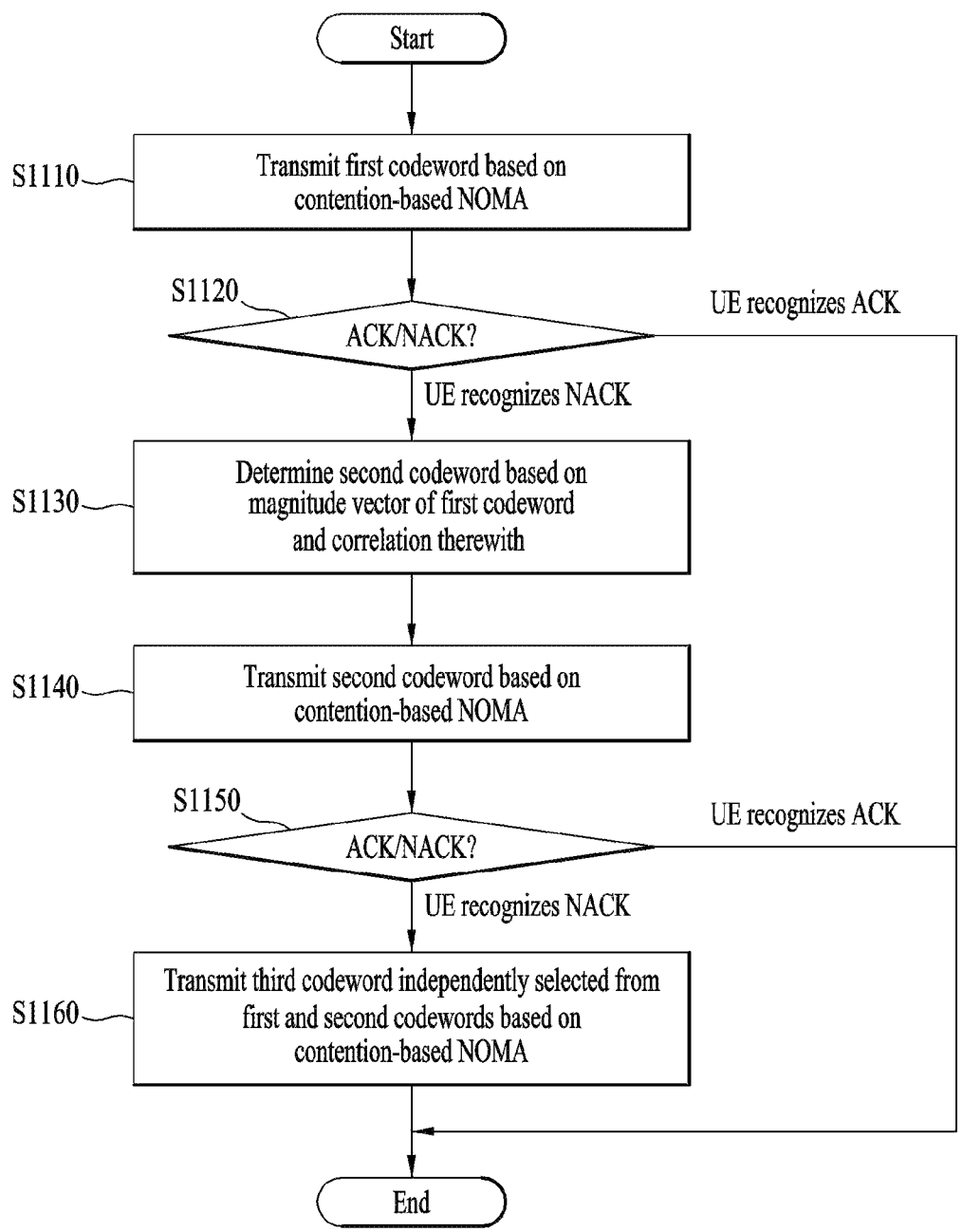
FIG. 11 is a flowchart illustrating a signal transmission method based on a contention-based NOMA scheme.

FIG. 11 is a flowchart illustrating a signal transmission method based on a contention-based NOMA scheme.

A UE may transmit a first codeword to a BS using a contention-based NOMA scheme [S1110]. In this case, if the UE receives ACK [S1120], the UE may terminate transmission. On the other hand, if the UE receives NACK [S1120], the UE may determine a second codeword based on the magnitude vector of the first codeword and a correlation therewith. As described with reference to FIGS. 1 to 10, the second codeword may be a codeword selected by considering deep fading in the contention-based NOMA scheme.

Next, the UE may transmit the second codeword based on the contention-based NOMA scheme [S1140]. In this case, the UE may transmit the second codeword based on the contention-based NOMA scheme in the same way as described above with reference to FIGS. 1 to 10.

When the UE receives ACK in response to the second codeword from the BS [S1150], the signal transmission may be terminated. On the other hand, when the UE receives NACK in response to the second codeword from the BS [S1160], the UE may transmit a third codeword to the BS using the contention-based NOMA scheme. In this case, the third codeword transmitted by the UE may be independently selected regardless of the first and second codewords. That is, as described above with reference to FIGS. 1 to 10, the UE may determine that the transmission failure does not result from the deep fading and then transmit the third codeword, which is independently selected regardless of the previous codewords, to the BS.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. Although the present disclosure describes and illustrates the preferred embodiments of the invention, it is apparent that the invention is not limited to these particular embodiments and various modifications and variations can be made by those skilled in the art to which the present invention pertains without departing from the gist of the appended claims. Thus, it is intended that the present invention cover the modifications and variations of this invention provided they come within the scope of the appended claims and their equivalents.

This specification describes both the product invention and method invention, and if necessary, the two inventions can be complementarily interpreted.

INDUSTRIAL APPLICABILITY

The present disclosure can be applied not only to the 3GPP LTE and LTE-A systems but also to various wireless communication systems including IEEE 802.16x and IEEE 802.11x systems. Further, the proposed method can be applied to a communication system using ultra-high frequency bands.

What is claimed is:

1. A method of transmitting a signal based on a contention-based Non-Orthogonal Multiple Access (NOMA) scheme by a User Equipment (UE) in a wireless communication system, the method comprising:

transmitting a first codeword based on the contention-based NOMA scheme;

receiving a Negative Acknowledgement (NACK) for the transmission of the first codeword from a Base Station (BS);

based on the NACK for the transmission of the first codeword being received, selecting a second codeword; and transmitting the selected second codeword based on the contention-based NOMA scheme, wherein the NACK for the transmission of the first codeword is received together with an indicator indicating whether there is deep fading, wherein based on the indicator being set to a first value, the second codeword is selected based on a magnitude vector of the first codeword and a correlation therewith, and wherein based on the indicator being set to a second value, the second codeword is selected independently from the first codeword.

2. The method of claim 1, further comprising, based on a NACK for the transmission of the second codeword being received, transmitting a third codeword based on the contention-based NOMA scheme.

3. The method of claim 2, wherein the third codeword is selected independently from the first and second codewords and transmitted.

4. The method of claim 1, wherein the first codeword is transmitted in a first resource pool.

5. The method of claim 4, wherein based on the NACK for the transmission of the first codeword being received from the BS, the first codeword is retransmitted in a second resource pool.

6. The method of claim 5, wherein a resource pool in which the first codeword is transmitted is configured differently depending on the number of retransmission times of the first codeword.

7. The method of claim 1, wherein based on there being a predetermined number or more of UEs within coverage of a cell where the UE camps on, the first codeword is transmitted based on a grant-based transmission scheme.

8. The method of claim 7, wherein based on the first codeword being transmitted based on the contention-based NOMA scheme, the first codeword is transmitted together with codewords of other UEs in a same time-frequency region, and wherein based on the first codeword being transmitted based on the grant-based transmission scheme, the first codeword is transmitted in a time-frequency region that is uniquely allocated by the BS.

9. A User Equipment (UE) for transmitting a signal based on a contention-based Non-Orthogonal Multiple Access (NOMA) scheme in a wireless communication system, the UE comprising:

a receiver configured to receive a signal;
a transmitter configured to transmit a signal; and
a processor configured to control the receiver and the transmitter,
wherein the processor is configured to:
transmit, using the transmitter, a first codeword based on the contention-based NOMA scheme;
receive, using the receiver, a Negative Acknowledgement (NACK) for the transmission of the first codeword from a Base Station (BS);
based on the NACK for the transmission of the first codeword being received, select a second codeword; and
transmit, using the transmitter, the selected second codeword based on the contention-based NOMA scheme,
wherein the NACK for the transmission of the first codeword is received together with an indicator indicating whether there is deep fading,
wherein based on the indicator being set to a first value, the second codeword is selected based on a magnitude vector of the first codeword and a correlation therewith, and wherein based on the indicator being set to a second value, the second codeword is selected independently from the first codeword.

10. The UE of claim 9, wherein based on a NACK for the transmission of the second codeword being received, a third codeword is transmitted based on the contention-based NOMA scheme, and wherein the third codeword is selected independently from the first and second codewords and transmitted.

11. The UE of claim 10, wherein based on there being a predetermined number or more of UEs within coverage of a cell where the UE camps on, the first codeword is transmitted based on a grant-based transmission scheme, and wherein based on the first codeword being transmitted based on the contention-based NOMA scheme, the first codeword is transmitted together with codewords of other UEs in a same time-frequency region, and
wherein based on the first codeword being transmitted based on the grant-based transmission scheme, the first codeword is transmitted in a time-frequency region that is uniquely allocated by the BS.

12. The UE of claim 9, wherein based on the NACK for the first codeword transmitted in a first resource pool being received from the BS, the first codeword is retransmitted in a second resource pool, and wherein a resource pool in which the first codeword is transmitted is configured differently depending on the number of retransmission times of the first codeword.

13. At least one computer-readable storage medium storing instructions that, based on being executed by a processor, control a User Equipment (UE) to perform operations of transmitting a signal based on a contention-based Non-Orthogonal Multiple Access (NOMA) scheme in a wireless communication system, the operations comprising:

transmitting a first codeword based on the contention-based NOMA scheme;
receiving a Negative Acknowledgement (NACK) for the transmission of the first codeword from a Base Station (BS);
based on the NACK for the transmission of the first codeword being received, selecting a second codeword; and
transmitting the selected second codeword based on the contention-based NOMA scheme,
wherein the NACK for the transmission of the first codeword is received together with an indicator indicating whether there is deep fading,
wherein based on the indicator being set to a first value, the second codeword is selected based on a magnitude vector of the first codeword and a correlation therewith, and
wherein based on the indicator being set to a second value, the second codeword is selected independently from the first codeword.

* * * * *